United States Patent [19]

McConnell et al.

[11] Patent Number: 5,355,693
[45] Date of Patent: Oct. 18, 1994

[54] POWER VENTILATOR FOR A REFRIGERATOR IN A VEHICLE

[75] Inventors: Patrick N. McConnell, Goshen; Bruce L. Boxum, Angola, both of Ind.

[73] Assignee: The Dometic Corporation, LaGrange, Ind.

[21] Appl. No.: 45,915

[22] Filed: Apr. 12, 1993

[51] Int. Cl.⁵ .................. F24C 3/00; F25B 15/00; B60H 3/04
[52] U.S. Cl. .................. 62/2.44; 62/476; 62/428
[58] Field of Search ............ 62/404, 428, 476, 485, 62/239, 244, 146

[56] References Cited

U.S. PATENT DOCUMENTS

| | | | |
|---|---|---|---|
| 147,834 | 2/1874 | Gates . | |
| 1,913,869 | 6/1933 | Bichowsky | 62/146 |
| 2,040,174 | 5/1936 | Hainsworth | 62/485 |
| 2,137,060 | 11/1938 | Otto et al. | 62/146 |
| 2,164,045 | 6/1939 | Ullstrand et al. | 62/485 |
| 2,592,712 | 4/1952 | Knoy | 62/239 |
| 2,743,589 | 5/1956 | Kuempel | 62/244 |
| 3,633,376 | 1/1972 | Miner | 62/181 |
| 3,906,740 | 9/1975 | Thomas | 62/239 |
| 4,236,749 | 12/1980 | Schluns | 296/156 |
| 4,286,569 | 9/1981 | Bergman et al. | 62/239 X |
| 4,545,211 | 10/1985 | Gaus | 62/115 |
| 4,914,919 | 4/1990 | Walfridson et al. | 62/236 |
| 5,050,398 | 9/1991 | Lane et al. | 62/183 |

Primary Examiner—Henry A. Bennet
Assistant Examiner—William C. Doerrler
Attorney, Agent, or Firm—Pearne, Gordon, McCoy & Granger

[57] ABSTRACT

A refrigerator is located in a central island or wall of a vehicle. An air duct extends downwardly from the refrigerator through a floor of the vehicle. A fan is installed in the duct to aid air circulation. The fan is controlled by a temperature switch located on a condenser of the refrigerator. Air for cooling the condenser and an absorber are drawn up the duct from outside the vehicle and exhausted outside the vehicle through an upper duct and vent in a roof of the vehicle.

14 Claims, 2 Drawing Sheets

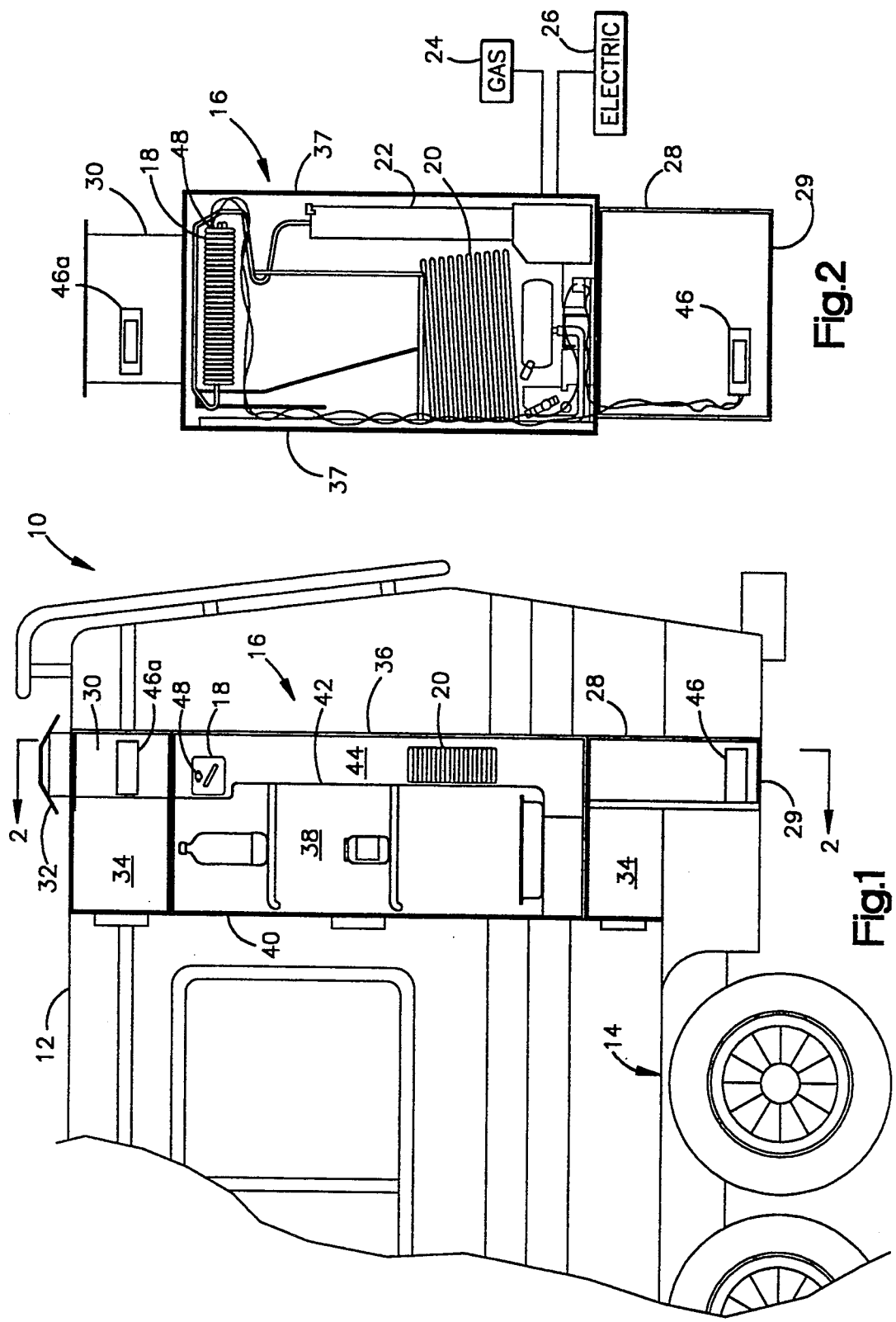

POWER VENTILATOR FOR A REFRIGERATOR IN A VEHICLE

BACKGROUND OF THE INVENTION

1. Field of the Invention

This invention relates generally to refrigerators, and specifically, to an improved ventilation system for an absorption refrigerator located within the interior of a vehicle.

2. Description of the Related Art

It is common for recreational vehicles to have refrigerators on board for cooling and preserving food and drinks in a compartment. These refrigerators are usually absorption-type refrigerators which use a heat source to effect refrigeration. An absorption refrigerator has a heat generator which heats a solution of a refrigerant and an absorbent. The heat releases the refrigerant from the absorbent to form a high pressure refrigerant vapor. The refrigerant vapor is condensed in a cooling condenser. Low pressure solution from the heat generator is sprayed on the refrigerant vapor in an absorber to absorb the vapor. The absorption causes the pressure of the vapor to be reduced, thereby causing evaporation in an evaporator between the condenser and the absorber. The refrigerant vapor expands in the evaporator which causes a temperature drop in the refrigerant which is used to cool the compartment. The solution of refrigerant and absorbent is then pumped back to the heat generator.

Absorption refrigerators are favored in vehicles, such as campers or recreational vehicles, because a compressor is not required and the heat generator can be an electrical resistance heater or a gas heater. The electrical resistance heater can be powered by a direct current supply of the vehicle or a commercial alternating current supply at a campground, for example. The gas heater can be fueled by propane gas which is usually carried on recreational vehicles. Combustion of the propane creates waste gasses, such as carbon dioxide, which should be vented outside the vehicle.

It is necessary to cool the condenser and absorber of the refrigerator. This is economically achieved by creating an airflow over the condenser and absorber. To create this airflow, the refrigerator is usually located adjacent an outer wall of the vehicle, and a duct is provided through the wall to permit airflow over the condenser and absorber. An exhaust is provided through a second duct. In some installations, a fan is provided to promote airflow. Such fans run continuously and are a significant drain on available power.

Locating the refrigerator near the outside wall limits the arrangement of other objects in the vehicle, such as cabinets, partitions, furniture and other appliances. In addition, panels for access to the refrigerator located on sidewalls of the vehicle can permit rain water to enter the vehicle or the refrigerator.

U.S. Pat. No. 4,545,211 to Gaus shows a compressor-type refrigerator for a vehicle. The refrigerator is located in an "island" in the vehicle between the passenger seats. An air intake is provided on the front of the island and an air outlet is provided on the back. A fan draws air from the vehicle through the inlet, over the condenser, and through the outlet back into the vehicle.

It would be desirable to provide a refrigerator having a ventilation system which permits an absorption-type refrigerator to be placed at an interior location in the vehicle. The need for air intake ducts in the sidewalls should be eliminated to provide floorplan flexibility. Airflow over the condenser and absorber should be facilitated by the ventilation system while conserving power. Air used to cool the condenser and absorber should come from outside the vehicle and be exhausted to carry heat and combustion products outside the vehicle.

SUMMARY OF THE INVENTION

The present invention provides a ventilation system for an absorption refrigerator having a condenser and located in a vehicle having a floor and a roof. A lower air duct extends through the floor and communicates with an air passage in which the condenser is located. An upper air duct extends outside the vehicle and communicates with the air passage.

The air ducts and air passage create a chimney effect to carry heat and exhaust; gasses upwardly away from the refrigerator. The chimney effect is best achieved by extending the upper duct through the roof of the vehicle. Cooler air is pulled into the duct to cool the condenser and absorber. A blower can be provided to promote airflow through the ducts. Preferably, the blower is controlled by a temperature sensitive switch located in the air passage, for example, on the condenser. The blower should be activated when the temperature of the condenser rises above a specified level indicating that a greater airflow is necessary.

The ventilation system can be used with an absorption refrigerator whether it is heated by electricity, gas or both. The system could also apply to other appliances in a vehicle which require ventilation, such as a compression refrigerator, an air conditioner, or furnace.

The ventilation system according to the invention allows a refrigerator to be located anywhere in a vehicle floor plan without the need for an intake duct from a side wall. For example, the refrigerator can be located in an interior island, partition, or wall of the vehicle. Natural or convected airflow from outside the vehicle is promoted by the vertical arrangement of the ducts and augmented by the fan to be exhausted outside the vehicle.

BRIEF DESCRIPTION OF THE DRAWINGS

FIG. 1 shows a side elevation of a vehicle partially cut away to show the present invention;

FIG. 2 shows a rear view of the invention in section taken from line 2—2 of FIG. 1.

DESCRIPTION OF THE PREFERRED EMBODIMENT

Figure 3:
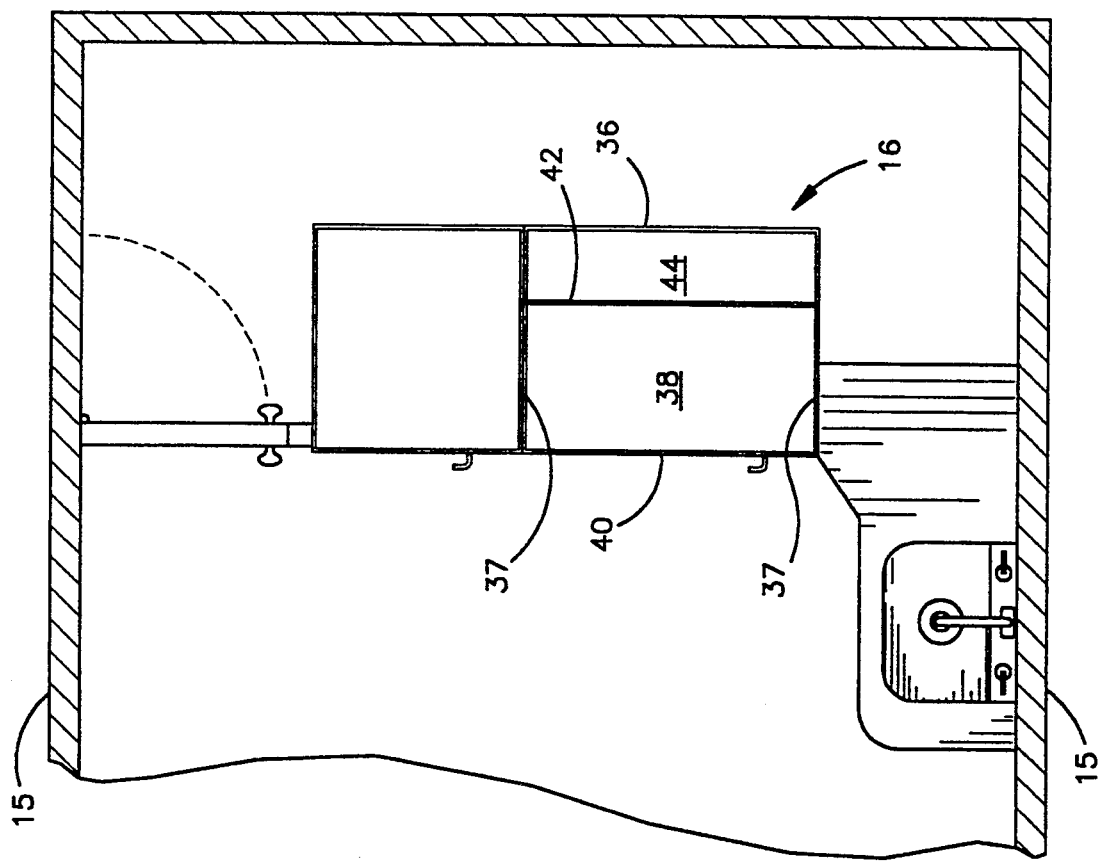
FIG. 3 shows a top plan view of the vehicle in section taken from line 3—3 of FIG. 1.

Referring to FIGS. 1 and 2, a vehicle 10, such as a recreational vehicle used for camping, has a roof 12 and a floor 14. Referring to FIG. 3, the vehicle has exterior sidewalls 15. The vehicle 10 has a refrigerator 16 installed inside the vehicle at an interior location spaced from the sidewalls 15 thereof. The refrigerator shown is of the absorption cycle type. Arranged in the refrigerator 10 are a condenser 18, an absorber 20, and a heater 22. The heater can be powered by propane gas 24 carried on board the vehicle 10 or by electrical power 26. The source of the electrical power can be a direct current power system of the vehicle or an alternating current supply at a campground, for example.

A lower vent duct 28 is provided below the refrigerator 16 and extends through the floor 14. The lower duct 28 is generally rectangular in shape and is made from sheet metal or another suitable material. A varmint screen 29 can be provided to keep animals and debris out of the lower duct 28. An upper vent duct 30 is provided above the refrigerator 10 and extends through the roof. A cap 32 can be provided to prevent rain from entering the duct 30. The vent ducts 28 and 30 can be fashioned from any suitable material, such as plastic or sheet metal. The upper duct 30 must withstand a degree of heating. The ducts shown are rectangular in cross-section to conform to a partition in which they are located. However, other shapes are suitable.

Storage cabinets 34 opening into the vehicle can be provided above or below the refrigerator 10.

The refrigerator 10 has a rear wall 36 and sidewalls 37 which can form an interior partition or island of the vehicle. The refrigerator can be located at any selected location inside the vehicle, either on the floor or supported above the floor. Preferably, the refrigerator 10 is located in a convenient location for access by persons in the vehicle as determined by the floor plan of the vehicle. Inside the refrigerator is a cooling compartment 38 for storing food and other items to be chilled. The cooling compartment has a door 40 opening to the vehicle and a rear wall 42. The rear wall 42 of the cooling compartment and the rear wall of the refrigerator 36 are separated to form an air passage 44 therebetween. The rear wall 36 can be adapted to permit access to the heater 22 and other components of the refrigerator. The condenser 18 and absorber 20 are located in the air passage 44. The lower duct 28, air passage 44, and upper duct 30 are arranged to be in communication with each other to permit air to flow along a path from outside the vehicle 10, through the lower duct 28, air passage 44, and upper duct 30. The air is exhausted outside the vehicle 10. Combustion gasses, when propane is used, from the heater 22 can also be exhausted through the upper duct 30.

Preferably a blower, such as a fan 46, is located in the intake or exhaust air flow path. Many types of blowers are suitable. Alternatively, a blower 46a may be located in the upper duct 30. As shown, it is located in the lower duct 28. The fan can be connected to be controlled by means, such as a temperature switch 48, located on the condenser 18. Preferably, the fan 46 should permit airflow through the lower duct when the fan is not operating.

The condenser 18 and absorber 20 require cooling. As shown, air flow through the air passage cools the condenser and absorber and carries the heat outside the vehicle through the upper duct 30. The vertical arrangement of the ducts and air passage promotes the air flow by creating a chimney effect. That is, the air heated by the condenser, heater 22 and absorber tends to rise through the upper duct and draw in cooler air through the lower duct 28.

The fan 46 can be used to further promote forced air flow. For example, on hot days, the natural air flow may not be sufficient to cool the condenser 18, and the condenser may rise above a desirable temperature. When the condenser exceeds a specified temperature, the temperature switch 48 closes to activate the fan 46. The fan augments the air flow through the air passage to further cool the condenser 18 until its temperature drops below the selected level and the fan is deactivated.

In this way, the condenser and absorber can be effectively cooled with a simple arrangement of ducts which permits the refrigerator to be located away from exterior walls.

The present disclosure describes several embodiments of the invention, however, the invention is not limited to these embodiments. Other variations are contemplated to be within the spirit and scope of the invention and appended claims.

What is claimed is:

1. A ventilation system for a refrigerator having a condenser, comprising:
   a recreational vehicle having exterior walls, a floor and a roof;
   an air passage disposed inwardly from all exterior walls in which the condenser is located;
   a lower air duct extending through the floor, communicating with the air passage, and disposed inwardly from all exterior walls; and
   an upper air duct extending outside the vehicle, communicating with the air passage and disposed inwardly from all exterior walls.

2. A ventilation system according to claim 1, further comprising a blower means to promote airflow over the condenser.

3. A ventilation system according to claim 2, wherein the blower means is located in the lower duct.

4. A ventilation system according to claim 2, wherein the blower means is located in the upper duct.

5. A ventilation system according to claim 2, wherein the blower means is a fan.

6. A ventilation system according to claim 2, further comprising a temperature activated means to control the blower.

7. A ventilation system according to claim 6, wherein the controller senses condenser temperature.

8. A ventilation system according to claim 6, wherein the controller is a switch.

9. A ventilation system according to claim 1, wherein the upper duct extends through the roof.

10. A absorption refrigerator system comprising:
    a recreational vehicle having a floor, exterior sidewalls, and a roof;
    a refrigerator having: a condenser; an absorber; and a heat generator;
    a lower air duct extending through the floor, disposed inwardly from all exterior sidewalls, and in communication with the condenser and absorber; and
    an upper air duct extending outside the vehicle, disposed inwardly from all exterior sidewalls and in communication with the condenser and absorber.

11. A refrigerator system according to claim 10, wherein the heat generator is fueled by electrical power.

12. A refrigerator system according to claim 11, wherein the heat generator is fueled by gas.

13. A refrigerator system according to claim 11, further comprising blower means to promote airflow over the condenser and absorber.

14. A ventilation system for an absorption refrigerator having a condenser and an absorber comprising:
    a recreational vehicle having exterior sidewalls;
    a lower air duct disposed inwardly from all exterior sidewalls, extending outside the vehicle and communicating with the condenser and the absorber;
    an upper air duct disposed inwardly from all exterior sidewalls, extending outside the vehicle and communicating with the condenser and absorber;
    a blower means to promote airflow over the condenser; and
    a temperature activated switch sensing condenser temperature to control the blower.

* * * * *